United States Patent [19]

Nishimura et al.

[11] Patent Number: 4,803,575
[45] Date of Patent: Feb. 7, 1989

[54] TAPE CASSETTES HAVING BOTTOM GROOVES FOR USE IN TAPE RECORDER HAVING BOTTOM PROJECTION IN CASSETTE HOLDER

[75] Inventors: Akihiro Nishimura, Osaka; Masao Kawagishi, Nara; Hideki Sakumoto; Masahiko Matsui, both of Osaka; Yoshinori Shiomi, Okayama, all of Japan

[73] Assignee: Matsushita Electric Industrial Co., Ltd., Osaka, Japan

[21] Appl. No.: 36,971

[22] Filed: Apr. 10, 1987

[30] Foreign Application Priority Data

Apr. 11, 1986 [JP] Japan ............................. 61-84504

[51] Int. Cl.⁴ .................. G11B 15/675; G11B 23/087
[52] U.S. Cl. ......................... 360/94; 360/96.5; 360/132
[58] Field of Search ............... 360/132, 96.5, 96.6, 360/94; 242/198

[56] References Cited

U.S. PATENT DOCUMENTS 4,580,183 4/1986 Maeda et al. ..................... 360/94
4,622,605 11/1986 Tsurudka et al. .................. 360/94

*Primary Examiner*—Robert S. Tupper
*Attorney, Agent, or Firm*—Wenderoth, Lind & Ponack

[57] ABSTRACT

An improved standard size video cassette has a top shell and a bottom shell held together so as to define a rectangular casing for storing therein a magnetic tape wound on reels. The bottom shell is formed with a groove having a width sufficiently wide to receive the projection therein with hardly any contact during cassette insertion into or ejection from the holder. An improved reduced size video cassette has a top shell and a bottom shell held together so as to define a rectangular casing for storing therein a magnetic tape wound on reels. The bottom shell is formed with the groove which is located such that a distance between the center of the groove and one end of the rectangular casing is slightly smaller than the distance between a center of the projection and one of the opposite side plates.

12 Claims, 5 Drawing Sheets

TAPE CASSETTES HAVING BOTTOM GROOVES FOR USE IN TAPE RECORDER HAVING BOTTOM PROJECTION IN CASSETTE HOLDER

BACKGROUND OF THE INVENTION

1. Field of the invention

The present invention relates to a tape cassette and, more particularly, to a video tape cassette.

2. Description of the Prior Art

Some video tape recorders accept two different sizes of video cassettes, a standard size video cassette 21, such as shown in FIG. 1, and a reduced size video cassette 22 such as shown in FIG. 2. The standard size video cassette has size such that the distance between opposite sides is A and the distance between the centers of the tape reels 1 is L, whereas the reduced size video cassette has a size such that the distance between opposite sides is B, which is shorter than the distance A, and the distance between the centers of the tape reels 6 is L, which is the same as that of the standard size video cassette.

As shown in FIG. 1, standard size video cassette 21 has a casing 2 defined by a top shell 2a and a bottom shell 2b which are closed together to provide a cassette cavity therein to store the tape wound on tape reels. A front face of cassette 21 has an opening 3 past which a magnetic tape 4 extends. A lid member 5 is provided on opening 3 to cover the tape when the tape is not in use.

Similarly, as shown in FIG. 2, reduced size cassette 22 has a casing 7 defined by a top shell 7a and a bottom shell 7b. An opening 8 is provided at the front face of cassette 22 past which tape 9 extends, having the same tape width as tape 4, thereacross and has a lid member 10 to cover the tape when the tape is not in use.

The standard size cassette has a groove 2c formed on the outer surface of the bottom shell 2b and extending straight between the front and back faces. Similarly, the reduced size cassette has a groove 7c formed on the outer surface of the bottom shell 7b. The grooves 2c and 7c have about the same width and the same depth. For example, if the thickness of the wall forming the bottom shell is about 2 millimeters, the depth of the groove is about 1.5–1.7 millimeters.

When in use, the video cassette is loaded in a video tape recorder by inserting the cassette in a cassette holder 11, such as shown in FIGS. 3 and 4. Cassette holder 11 is defined by a bottom plate 11c and opposite side plates 11a. The cassette holder may have a top plate, such as shown in FIGS. 5 and 6. Cassette holder 11 further has a projection 11b mounted on the bottom plate 11c and extending parallel to the side plates 11a. The width and the height of the projection is about the same as the width and the depth of the groove. Thus, in the case of the above example, the height of the projection is, at maximum, about 1.4 millimeters.

As shown in FIG. 5, when inserting the standard size cassette into the cassette holder, the cassette is held in position by the opposite side plates 11a receiving the opposite sides of the cassette and, at the same time, by projection 11b engaging groove 2c.

As shown in FIG. 6, when inserting the reduced size cassette into the cassette holder, the cassette is held in position by projection 11b engaging groove 7c. Since the reduced size cassette is inserted in the cassette holder with spaces left at opposite sides, one may need to move the cassette right and left before it is properly positioned in the cassette holder, or the projection may engaging a non-grooved area.

The problem the prior art cassettes is in that during the insertion and ejection of the cassette from the cassette holder, projection 11b slidingly engages the groove resulting in the wearing of the inner face defining the groove. This not only further results in the loose engagement with projection 11b, but also in producing undesirable powder from the wall of the groove. Such powder adheres on the magnetic tape to markedly deteriorate the picture quality such that image drop out occurs very often. The generation of the powder may be suppressed by grinding the edges of projection 11b, but it is very difficult to provide a smooth finish of the projection having such a small dimension.

SUMMARY OF THE INVENTION

The present invention has been developed with a view to substantially solving the above described problem and has for its essential object to provide improved standard size and reduced size video cassettes which will produce less undesirable powder from the wall of the groove.

It is also an essential object of the present invention to provide improved video cassettes which can be easily manufactured through molding.

It is a further object of the present invention to provide improved video cassettes which can be easily inserted in the cassette holder of the video tape recorder.

It is another object of the present invention to provide an improved reduced size cassette which can be easily inserted into the cassette holder.

In accomplishing these and other objects, an improved standard size video cassette according to the present invention comprises a top shell and a bottom shell held together so as to define a rectangular casing for storing therein a magnetic tape wound on reels. The bottom shell is provided with a groove having a width sufficiently wide to receive the projection therein with hardly any contact during cassette insertion into or ejection from the holder.

Also an improved reduced size video cassette according to the present invention comprises a top shell and a bottom shell held together so as to define a rectangular casing for storing therein a magnetic tape wound on reels. The bottom shell is formed with a groove which is located such that the distance between the center of the groove and one end of the rectangular casing is slightly smaller than the distance between the center of the projection and one of the opposite side plates.

BRIEF DESCRIPTION OF THE DRAWINGS

These and other objects and features of the present invention will become apparent from the following description of a preferred embodiment thereof with reference to the accompanying drawings, throughout which like parts are designated by like reference numerals, and in which:

FIG. 8b is a fragmentary perspective view of a bottom portion of the reduced size video cassette shown in FIG. 8a.

DESCRIPTION OF THE PREFERRED EMBODIMENTS

Figure 7:
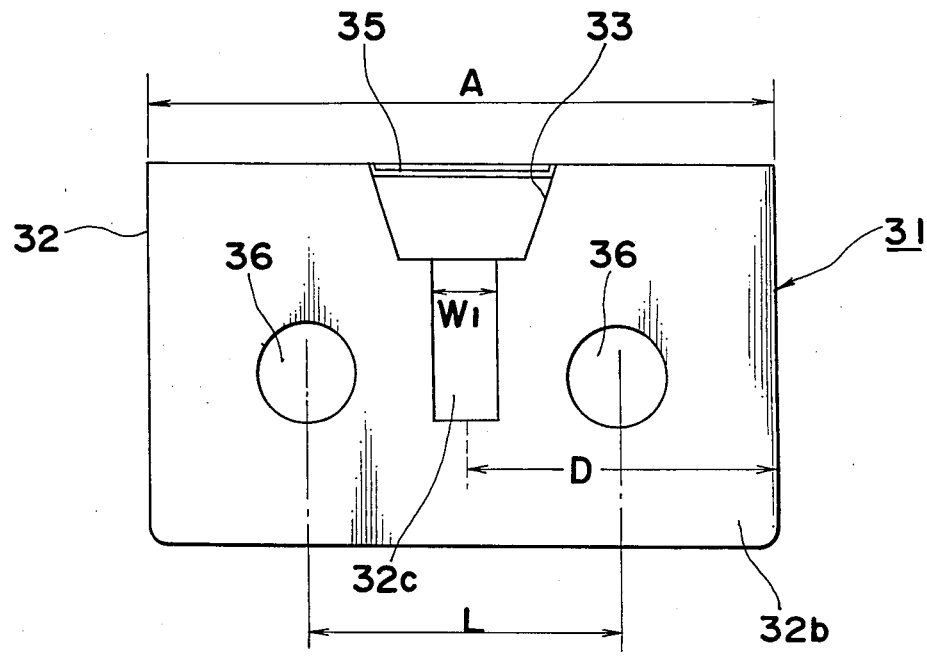
FIGS. 7 and 8a are bottom plan views of standard and reduced size video cassettes, respectively, according to the present invention.

Referring to FIG. 7 a standard size video cassette 31 of the present invention viewed from the bottom is shown.

Standard size cassette 31 has a size such that the distance between opposite sides is A, and the distance between the centers of the tape reels 36 is L. As shown in FIG. 7, standard size cassette 31 has a rectangular casing 32 defined by a top shell 32a (FIG. 9) and a bottom shell 32b which are closed together to provide a cassette cavity therein to store a magnetic tape wound on tape reels 35. A front face of cassette 32 has an opening 33 past which a magnetic tape extends. A lid member 35 is provided on opening 33 to cover the tape when the tape is not in use.

Standard size cassette 31 has a groove 32c formed on the outer surface of the bottom shell 32b and extending straight from the front face toward a back face and terminating intermediately thereof. The width W1 of groove 32c is between 5.9 millimeters and 6.2 millimeters and preferably about 6 millimeters, and the depth thereof is about 1.5 millimeters.

Figure 8A:
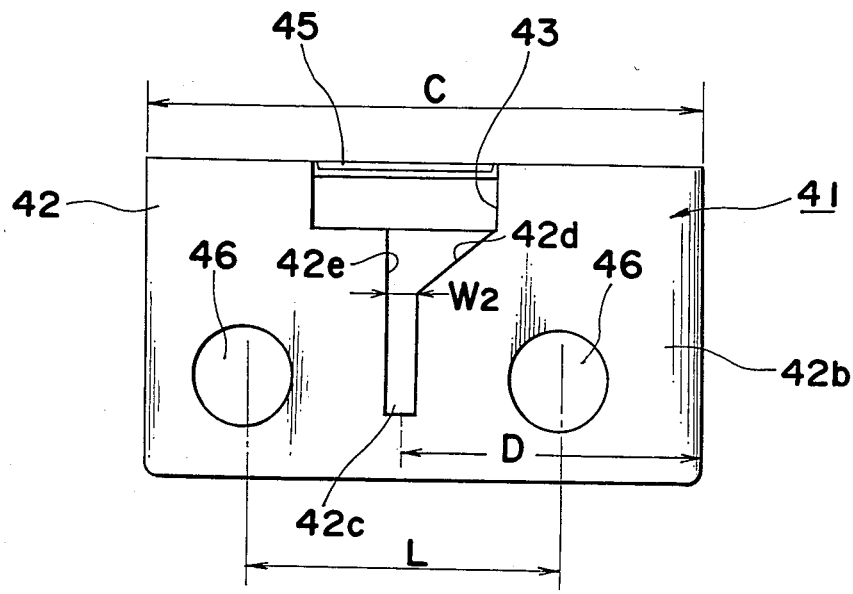

Referring to FIG. 8a, a reduced size video cassette 42 according to the present invention viewed from the bottom is shown.

Reduced size video cassette 42 has a size such that the distance between opposite sides is C, which is shorter than distance A, and the distance between the centers of the tape reels 46 is L, which is the same as that in the standard size video cassette. Reduced size cassette 42 has a rectangular casing 42 defined by a top shell 42a (FIG. 10) and a bottom shell 42b. An opening 43 is provided at the front face of cassette 42 past which the magnetic tape extends.

Reduced size cassette 42 further has a groove 42c formed on the outer surface of the bottom shell 42b and extending straight from the front face toward a back face and terminating intermediately thereof. The width W2 of groove 42c is between 5.5 millimeters and 5.6 millimeters and preferably about 5.5 millimeters, and the depth thereof is about 1.7 millimeters.

Figure 8B:
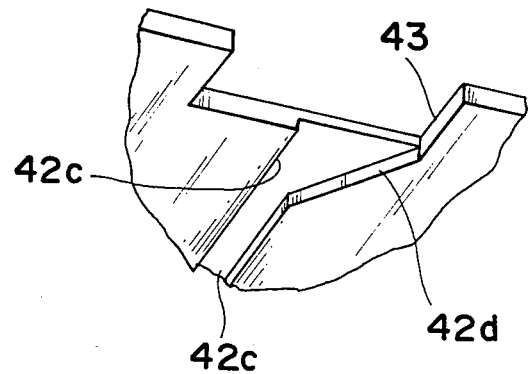

The distance, indicated by D, between the center of groove 42c and one side of the reduced size cassette 42 is the same as that in the standard size cassette Furthermore, the width W2 is smaller than the width W1. Also, as best shown in FIG. 8b, groove 42c has, at the entrance thereof, a slanted wall 42d on the side on which the distance D is measured, and a straight wall 42e on the opposite side.

Figure 1:
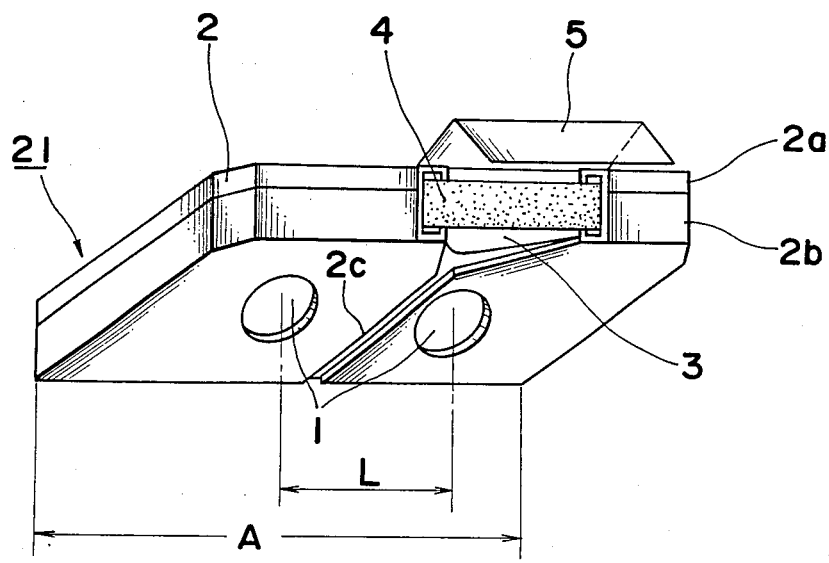
FIGS. 1 and 2 are perspective views showing the standard and reduced size video cassettes, respectively, of the prior art.
Figure 2:
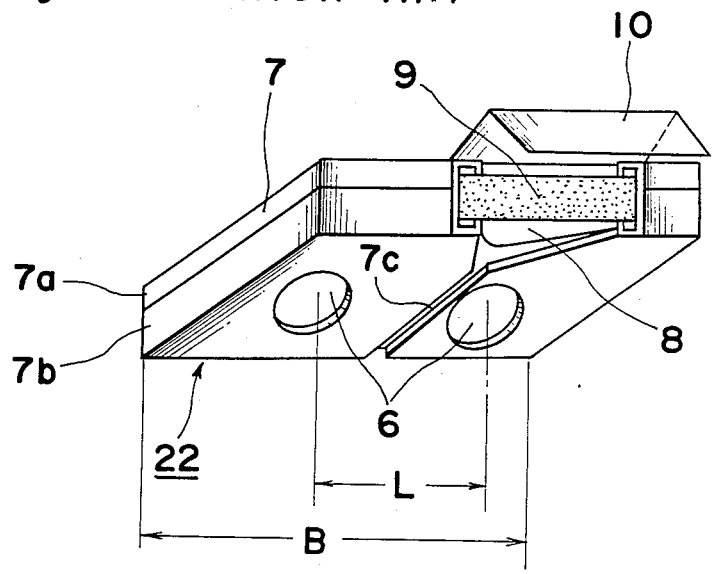
Figure 3:
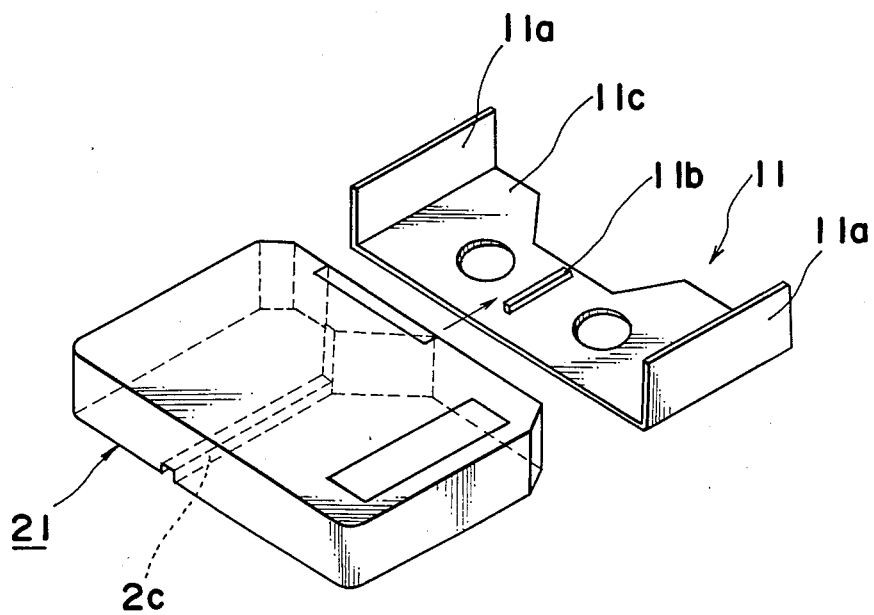
FIGS. 3 and 4 are perspective views showing a manner for inserting the standard and reduced size video cassettes of FIGS. 1 and 2, respectively, into a cassette holder of a video tape recorder.
Figure 4:
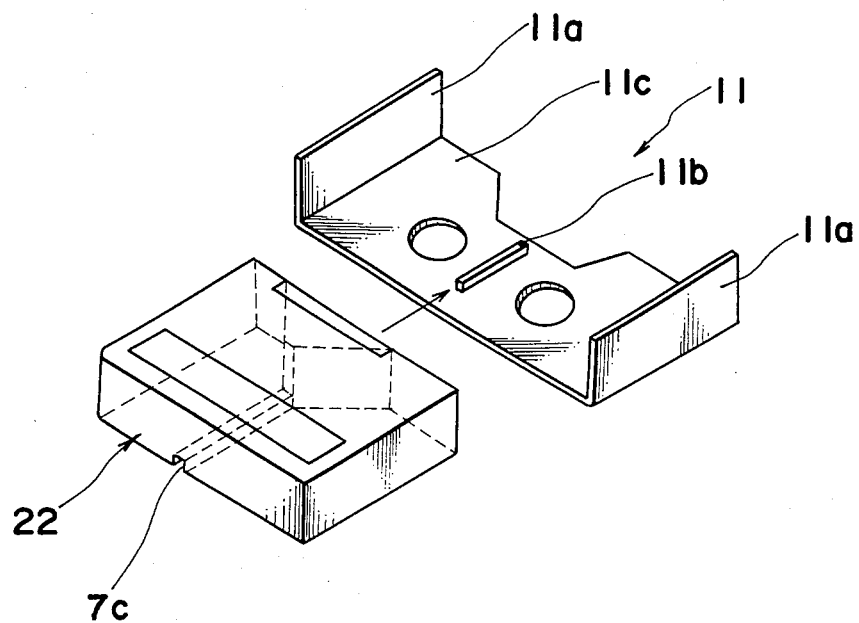
Figure 5:
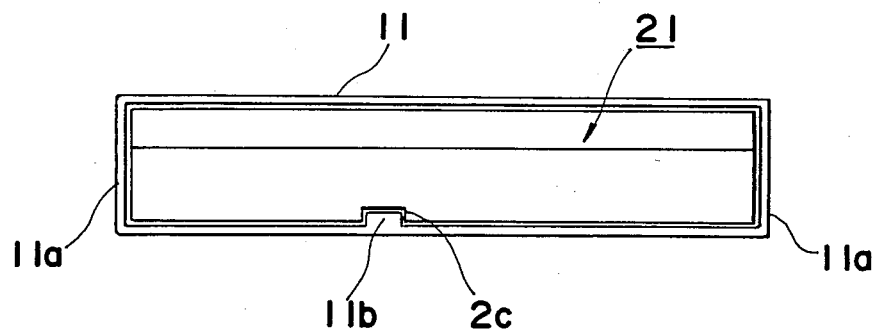
FIGS. 5 and 6 are front views showing the inserted positions of the standard and reduced size video cassettes of FIGS. 1 and 2, respectively, into the cassette holder of the video tape recorder.
Figure 6:
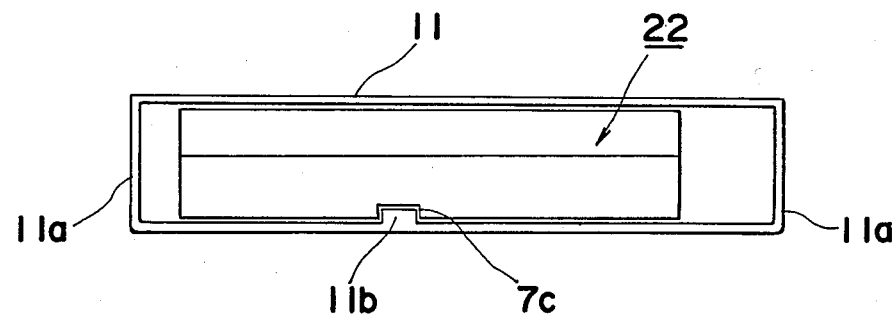
Figure 9:
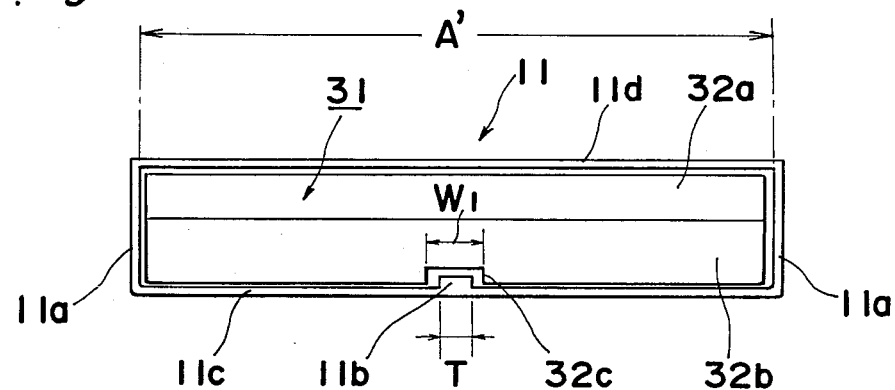
FIG. 9 and FIG. 10 are front views showing the inserted positions of the standard and reduced size video cassettes of FIGS. 7 and 8a, respectively.
Figure 10:
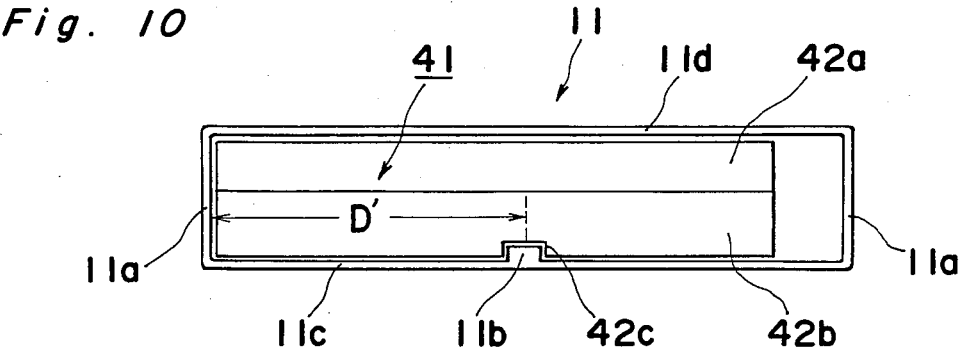

When in use, the video cassette is loaded in a video tape recorder by inserting the cassette in a cassette holder 11, as shown in FIGS. 9 and 10. Cassette holder 11 is defined by a bottom plate 11c having reel shaft openings (unnumbered) spaced a distance L, opposite side plates 11a, and a top plate 11d, and has a projection 11b mounted on the bottom plate 11c and extending parallel to side plates 11a. The distance A between opposite side plates 11a is slightly greater than the distance A of the standard cassette. According to one example of a portable type video tape recorder, the width T of projection 11b is about 5.2±0.05 millimeters, and the height thereof is about 1.4±0.1 millimeters. According to another example of a deck type, the width T of projection 11b is about 4.9-5.0 millimeters, and the height thereof is about 1.1-1.5 millimeters. In general, projection 11b has a width 4.9-5.3 millimeters and a height 1.1-1.4 millimeters.

According to the standard size cassette of the present invention, the width W1 of the groove is made much wider than the width of projection 11b, so that during the insertion and ejection of the standard size cassette from the cassette holder, groove 32c receives the projection therein with hardly any contact. In other words, during the cassette insertion or ejection, projection 11b is held away from the inner wall of groove 32c, thereby producing no powder from the inner wall. In this case, the standard cassette is properly positioned by the opposite side plates 11a.

As apparent from the above, the lower limit of the width of groove 32c is determined in consideration of the width of the projection 11b. The upper limit of the width W1 of groove 32c is determined from the following points. When the width W1 is made wider then the upper limit, a different problem arises that the bottom shell can be easily broken along and at the bottom of the groove. The breakage along the groove can be further prevented from another aspect that the groove according to the present invention is not as long as that in prior art. Another problem raising from extra wide groove is such that the molding process for making the bottom shell becomes difficult and time consuming, because it will be difficult for the molten resin to flow through a long narrow space where the groove bottom is to be formed. The flow of the molten resin inside the mold is made easier by making the groove shorter.

According to the reduced size cassette of the present invention, the distance D between the center of the groove and one end of the cassette is made the same as that of the standard size cassette. In other words, the distance D of the reduced size cassette 42 is slightly smaller than the distance D' between the center of projection 11b and one of the opposite side plates 11a. Accordingly, the insertion of the reduced size cassette into the holder can be easily done by holding said one side of the cassette against one inner side plate 11a of the holder during the cassette insertion. Also, during the insertion, projection 11b may contact slanted wall 42d so that the cassette is guided sideward until the projection aligns the groove. Thus, there will be no back and forth sideward movements of the cassette, or no engagement of the projection at non-grooved area, before the cassette is properly positioned, and, therefore, less powder will be produced. Also, the reduced size cassette has a short groove so that the strength along the groove can be improved and, also the molding process can be made easier, as has been described above in connection with the standard size cassette.

The present invention is applicable not only to a video cassette, but also to other cassettes such as audio cassettes.

Although the present invention has been fully described with reference to a preferred embodiment, many modifications and variations thereof will now be apparent to those skilled in the art, and the scope of the present invention is therefore to be limited not by the details of the preferred embodiment described above, but only by the terms of the appended claims.

What is claimed is:

1. A cassette for use in a tape recorder having a cassette holder defined by a bottom plate, opposite side plates, a projection on the bottom plate extending parallel to the side plates and reel shaft openings on opposite sides of the projection, said cassette comprising:
   a top shell;
   a bottom shell connected with said top shell to define a rectangular casing having end walls parallel to the side plates of the cassette holder;
   reels in said casing for storing a magnetic tape wound on said reels, said reels being spaced a distance corresponding to the spacing of the reel shaft openings on the cassette holder;
   said rectangular casing having an overall length slightly smaller than the distance between the opposite side plates of the cassette holder;
   said bottom shell having a groove extending parallel to said end walls and facing outwardly from the bottom thereof, said groove having a width substantially wider than the width of the projection, whereby when said cassette is inserted into or ejected from the cassette holder, said cassette is guided by the opposite side plates and the projection is received in said groove with substantially no contact between the bottom shell and the projection.

2. A cassette as claimed in claim 1, wherein said groove extends from one side edge of the bottom shell towards the opposite side edge thereof and terminates intermediately thereof.

3. A cassette as claimed in claim 1, wherein said groove has a width between 5.9 millimeters and 6.2 millimeters.

4. A cassette as claimed in claim 1, wherein said groove has a depth not less than 1.5 millimeters.

5. A cassette for use in a tape recorder having a cassette holder defined by a bottom plate, opposite side plates, a projection on the bottom plate extending parallel to the side plates and reel shaft openings on opposite sides of the projection, said cassette comprising:
   a top shell;
   a bottom shell connected with said top shell to define a rectangular casing having end walls at least one of which is parallel to the side plates of the cassette holder;
   reels in said casing for storing a magnetic tape wound on said reels, said reels being spaced a distance corresponding to the spacing of the reel shaft openings on the cassette holder;
   said bottom shell having a groove extending parallel to said end walls and facing outwardly from the bottom thereof, said groove having a width slightly wider than the width of the projection;
   said rectangular casing having an overall length substantially smaller than the distance between the opposite side plates of the cassette holder, and having a length dimension from said one end wall to the longitudinal centerline of said groove which is slightly smaller than the distance between the corresponding side plate of the cassette holder and the centerline of the projection;
   whereby when said cassette is inserted into or ejected from the cassette holder, said cassette is guided by the one side plate and the projection received in said groove.

6. A cassette as claimed in claim 5, wherein said groove extends from one side edge of the bottom shell towards the opposite side edge thereof and terminates intermediately thereof.

7. A cassette as claimed in claim 5, wherein said groove has a width between 5.5 millimeters and 5.6 millimeters.

8. A cassette as claimed in claim 5, wherein said groove has a depth not less than 1.7 millimeters.

9. A cassette as claimed in claim 5, wherein said groove has a slanted wall at the end of said groove which is toward the cassette holder when said cassette is inserted into the cassette holder, and which is on the side toward said one end wall of said rectangular casing, and the wall on the opposite side of said groove is a straight wall.

10. In combination;
    a tape recorder having a cassette holder defined by a bottom plate, opposite side plates, a projection on said bottom plate extending parallel to said side plates, and reel shaft openings on opposite sides of said projection;
    a standard cassette having a top shell, a bottom shell connected with said top shell to define a rectangular casing having end walls parallel to said side plates of said cassette holder, reels in said casing for storing a magnetic tape wound on said reels, said reels being spaced a distance corresponding to the spacing of said reel shaft openings on said cassette holder, said rectangular casing having an overall length slightly smaller than the distance between said opposite side plates of the cassette holder, said bottom shell having a groove extending parallel to said end walls and facing outwardly from the bottom thereof, said groove having a width substantially wider than the width of said projection, whereby when said cassette is inserted into or ejected from said cassette holder, said cassette is guided by said opposite side plates and said projection is received in said groove with substantially no contact between said bottom shell and said projection; and
    a reduced size cassette having a further top shell, a further bottom shell connected with said further top shell to define a further rectangular casing having further end walls at least one of which is parallel to said side plates of said cassette holder, further reels in said further casing for storing a further magnetic tape wound on said further reels, said further reels being spaced a distance corresponding to the spacing of said reel shaft openings on said cassette holder, said further bottom shell having a further groove extending parallel to said further end walls and facing outwardly from the bottom thereof, said further groove having a width slightly wider than the width of said projection.

11. In combination;
    a tape recorder having a cassette holder defined by a bottom plate, opposite side plates, a projection on said bottom plate extending parallel to said side plates, and reel shaft openings on opposite sides of said projection;
    a standard cassette having a top shell, a bottom shell connected with said top shell to define a rectangular casing having end walls parallel to said side plates of said cassette holder, reels in said casing for storing a magnetic tape wound on said reels, said reels being spaced a distance corresponding to the spacing of said reel shaft openings on said cassette holder, said rectangular casing having an overall length slightly smaller than the distance between said opposite side plates of the cassette holder, said bottom shell having a groove extending parallel to said end walls and facing outwardly from the bottom thereof, said rectangular casing having a length dimension from said one end to the longitudinal centerline of said groove which is slightly smaller than the distance between the corresponding side plate of said cassette holder and the centerline of said projection;

a reduced size cassette having a further top shell, a further bottom shell connected with said further top shell to define a further rectangular casing having further end walls at least one of which is parallel to said side plates of said cassette holder, further reels in said further casing for storing a further magnetic tape wound on said further reels, said further reels being spaced a distance corresponding to the spacing of said reel shaft openings on said cassette holder, said further bottom shell having a further groove extending parallel to said further end walls and facing outwardly from the bottom thereof, said further rectangular casing having an overall length substantially smaller than the distance between said opposite side plates of said cassette holder, and having a length dimension from said one further end wall to the longitudinal centerline of said further groove which is slightly smaller than the distance between the corresponding side plate of said cassette holder and the centerline of said projection, whereby when said further cassette is inserted into or ejected from said cassette holder, said further cassette is guided by said one side plate and said projection received in said further groove.

12. In combination;

a tape recorder having a cassette holder defined by a bottom plate, opposite side plates, a projection on said bottom plate extending parallel to said side plates, and reel shaft openings on opposite sides of said projection;

a standard cassette having a top shell, a bottom shell connected with said top shell to define a rectangular casing having end walls parallel to said side plates of said cassette holder, reels in said casing for storing a magnetic tape wound on said reels, said reels being spaced a distance corresponding to the spacing of said reel shaft openings on said cassette holder, said rectangular casing having an overall length slightly smaller than the distance between said opposite side plates of the cassette holder, said bottom shell having a groove extending parallel to said end walls and facing outwardly from the bottom thereof, said rectangular casing having a length dimension from said one end to the longitudinal centerline of said groove which is slightly smaller than the distance between the corresponding side plate of said cassette holder and the centerline of said projection, said groove having a width substantially wider than the width of said projection, whereby when said cassette is inserted into or ejected from said cassette holder, said cassette is inserted into or ejected from said cassette holder, said cassette is guided by said opposite side plates and said projection is received in said groove with substantially no contact between said bottom shell and said projection; and a reduced size cassette having a further top shell, a further bottom shell connected with said further top shell to define a further rectangular casing having further end walls at least one of which is parallel to said side plates of said cassette holder, further reels in said further casing for storing a further magnetic tape wound on said further reels, said further reels being spaced a distance corresponding to the spacing of said reel shaft openings on said cassette holder, said further bottom shell having a further groove extending parallel to said further end walls and facing outwardly from the bottom thereof, said further groove having a width slightly wider than the width of said projection, said further rectangular casing having an overall length substantially smaller than the distance between said opposite side plates of said cassette holder, and having a length dimension from said one further end wall to the longitudinal centerline of said further groove which is slightly smaller than the distance between the corresponding side plate of said cassette holder and the centerline of said projection, whereby when said further cassette is inserted into or ejected from said cassette holder, said further cassette is guided by said one side plate and said projection received in said further groove.

* * * * *